US006621482B2

(12) United States Patent
Fuller

(10) Patent No.: US 6,621,482 B2
(45) Date of Patent: Sep. 16, 2003

(54) DISPLAY ARRANGEMENT WITH BACKLIGHT MEANS

(75) Inventor: Bradley Joseph Fuller, Palo Alto, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 212 days.

(21) Appl. No.: 09/826,444

(22) Filed: Apr. 4, 2001

(65) Prior Publication Data

US 2002/0171617 A1 Nov. 21, 2002

Related U.S. Application Data

(60) Provisional application No. 60/204,313, filed on May 15, 2000, provisional application No. 60/204,233, filed on May 15, 2000, and provisional application No. 60/204,215, filed on May 15, 2000.

(51) Int. Cl.[7] .............................................. G02F 1/1335
(52) U.S. Cl. .......................................... 345/102; 349/61
(58) Field of Search ................................ 345/102, 211, 345/98, 87; 348/673, 575, 691

(56) References Cited

U.S. PATENT DOCUMENTS 5,870,154 A 2/1999 Conover et al. ............ 348/673
5,936,602 A * 8/1999 Tsuchida et al. .............. 345/99
6,111,559 A * 8/2000 Motomura et al. ......... 345/102

* cited by examiner

*Primary Examiner*—Vijay Shankar
*Assistant Examiner*—Nitin Patel
(74) *Attorney, Agent, or Firm*—Gwenaelle Le Pennec

(57) ABSTRACT

A transmissive display arrangement is provided comprising an array of cells, video controlling means, backlight means and backlight controlling means. The video s controlling means is configured to derive an adjusted video signal based on an initial video signal. The initial video signal represents a frame to be displayed by the display arrangement. The backlight means provides a backlight signal to the array in response to a backlight control signal. The backlight control signal is associated with the frame. The backlight controlling means is coupled to the video controller and derives the backlight control signal from the initial video signal and the adjusted video signal.

14 Claims, 5 Drawing Sheets

DISPLAY ARRANGEMENT WITH BACKLIGHT MEANS

RELATED APPLICATIONS

This application claims the benefit of U.S. Provisional Applications 60/204,313, 60/204,215 and 60/204,233 all filed May 15, 2000 hereby incorporated by reference.

FIELD OF THE INVENTION

The invention relates to an apparatus and a transmissive display arrangement.

The invention also relates to a control circuit in a transmissive display arrangement. The invention may be used for the display of a video signal on a transmissive non-emitting display system.

The invention further relates to a storage medium for storing instructions for carrying out a method of adjusting a backlight signal in a transmissive display arrangement.

BACKGROUND ART

Displays can be divided into self-emitting displays and non-emitting displays. A CRT (Cathode Ray Tube) display is a representative of self-emitting devices. A Liquid Crystal Display (LCD) is a non-emitting device, in which the liquid crystal regulates the light transmittance. Since the LCD itself does not produce light, light must be obtained from an external source. In a reflective system, ambient light is used. A reflective system produces a display by reflecting ambient light from a highly reflective film that is fixed on the far side of the panel. In a transmissive system, a light source is provided at the rear of the LCD panel in order to supply illumination from the back. The light source used in a transmissive system is called a backlight. The prominent type of backlight is small fluorescent tubes mounted with a special mechanism that transforms the line-source light beam emerging from the fluorescent tubes into an area-wide illumination to cover the entire panel. Another emerging type of backlight is Light Emitting Diodes (LED) that have the advantage of permitting fast switching.

U.S. Pat. No. 5,870,154 discloses a circuit and method for optimizing the display of a video signal on a display. Control of the display's brightness and contrast is based on aspects of the video signal, such as the average amplitude of the signal and the standard deviation. These aspects of the video signal are determined and the video signal is manipulated based on the determined characteristics such that the resultant video signal is optimized to the dynamic range of the display.

In such a known circuit, an identification circuit analyzes a conditioned video signal to identify properties of the video signal, e.g. the minimum and maximum amplitudes of the video signal and based on the identified properties, causes a signal conversion circuit to modify the data provided to the display unit to utilize a greater portion of the display's dynamic range.

SUMMARY OF THE INVENTION

Known methods adjust the video signal without influencing the backlight signal.

It is an object of the invention to take advantage of the robustness and fast switching capability of an LED backlight arrangement of a transmissive display.

It is another object of the invention to provide a transmissive display arrangement that allows lowering the power consumption of backlight means.

It is yet another object of the invention to provide a low-power consumption display arrangement or apparatus.

To this end, an apparatus of the invention comprises:

a transmissive display arrangement;

an arrays of cells;

video controlling means for deriving an adjusted video signal from an initial video signal representing a frame to be displayed by the display arrangement; and, backlight means for providing a backlight signal to the array in response to a backlight control signal associated with the frame;

backlight controlling means, coupled to the video controlling means, for deriving the backlight control signal from the initial video signal and the adjusted video signal.

Such an apparatus comprises an array of cells and the video signal is applied to at least one of the cells. Besides, the display arrangement comprises the backlight means transmitting the backlight signal to the cell in response to the backlight control signal. Thus, from the video and the backlight signals, the cell may produce a displayed output. The invention comprises determining the video signal to be provided to the cell, hereafter referred to as the adjusted video signal. The invention also comprises determining the backlight control signal to be provided to the backlight means, hereafter referred to as the backlight control signal. The backlight control signal and the adjusted video signal are determined for a given frame to be displayed by the display arrangement. The adjusted video signal may be determined either arbitrarily, from characteristics of the initial video signal such as a distribution property of the initial video signal as explained hereinafter, or from any other parameter of the display arrangement. The backlight control signal is determined from the adjusted video signal and from the initial video signal. In another embodiment, the backlight control signal is also further derived based on an initial control signal. The invention allows modulating and more precisely lowering the backlight signal, through the modulation of the backlight control signal, by modifying the initial video signal. As a result, by enabling lowering the backlight signal, the invention permits power savings. An apparatus of the invention may allow to have such a described process quasi-transparent to a user. Indeed, the backlight control signal may be determined so that the cell would lead to comparable displayed outputs when receiving the initial video signal and an initial backlight signal, corresponding to an initial backlight control signal, as it would when receiving the adjusted backlight signal and the adjusted backlight signal.

Such an apparatus may comprise an LCD arrangement, for which the backlight means comprises an LED arrangement. The fast switching capability of an LED allows adjusting the backlight signal and determining the adjusted video signal for each displayed frame at the refresh rate of the display arrangement.

In another embodiment of the invention, the video controlling means is further configured to determine the adjusted video signal based on a distribution property of the initial video signal.

In such an embodiment, basing the adjustment of the initial video signal on its distribution property permits determining an adjusted video signal that covers the entire value range available for the video signal to be ultimately provided to the cells. As a consequence the backlight control signal may be determined such that it optimizes the generation of the backlight signal.

In yet another embodiment of the invention, the backlight controlling means is configured to further derive the backlight control signal from a maximum allowed value for the initial video signal and from a reference value of the initial video signal. The reference value may be determined from a distribution property of the initial video signal. In this embodiment, the video controlling means is configured to derive, for each cell of the array, a value of the adjusted video signal associated with the cell based on said reference value, said maximum allowed value and a value of the initial video signal associated with the cell.

In this embodiment, the reference value may be determined from a comparison of values of the initial video signal, each value being respectively associated with a cell of the array. The initial video signal may not use values greater than the maximum allowed value. The reference value is therefore lower than this maximum allowed value. The reference value of the initial video signal may then be adjusted to the maximum allowed value of the video signal. In this embodiment, the backlight control signal may then be determined based on the reference value and on the maximum allowed value. In an embodiment, where the reference value is the greatest value of the initial video signal associated with a given frame, the backlight signal may be lowered at a minimum for the frame. An advantage of one or more embodiments of the invention is to allow lowering at a minimum the backlight intensity in a transmissive display thereby enabling efficient power savings.

BRIEF DESCRIPTION OF THE DRAWINGS

The invention is explained in further detail, by way of example, and with reference to the accompanying drawing wherein.

Elements within the drawing having similar or corresponding features are identified by like reference numerals.

PREFERRED EMBODIMENT

Figure 1:
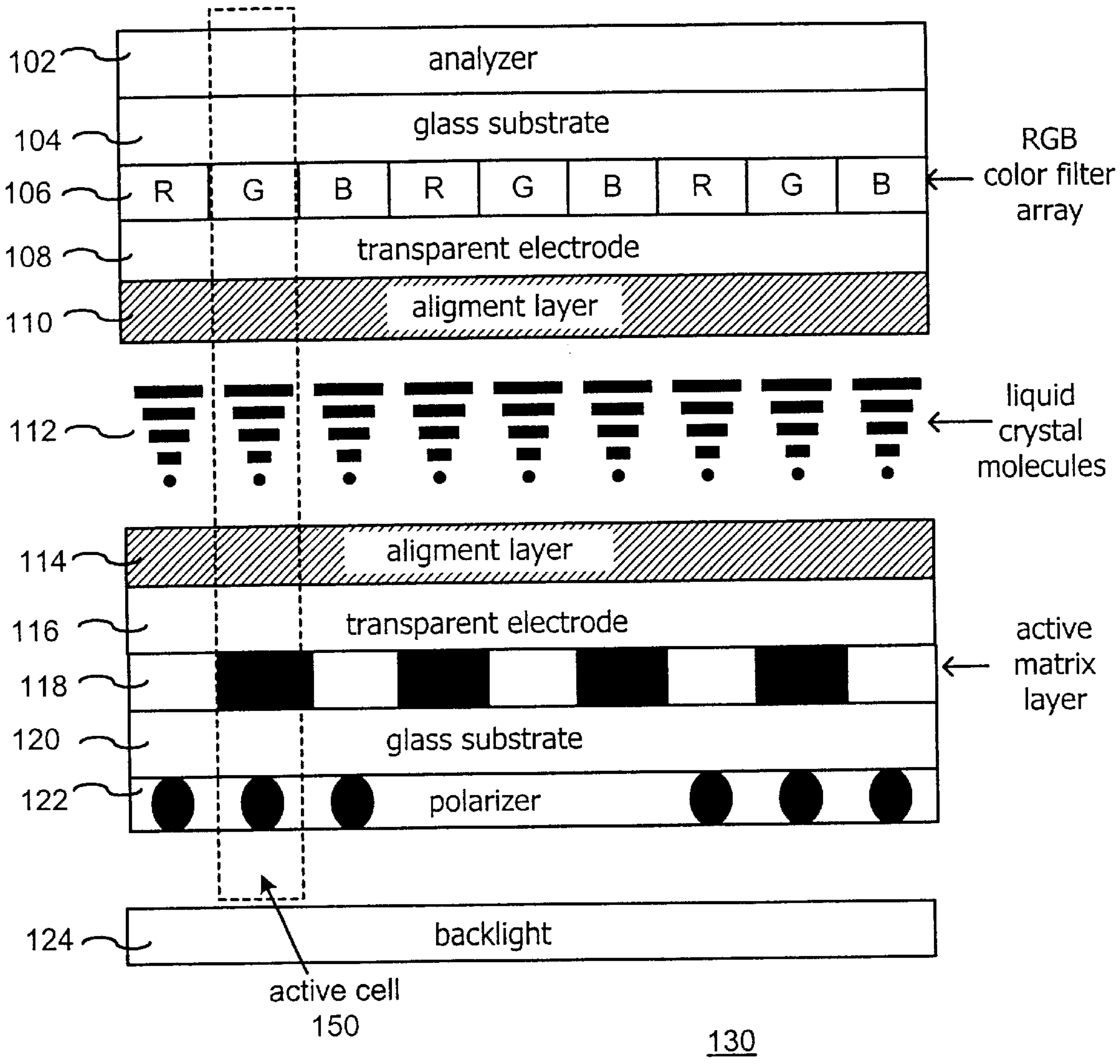
FIG. 1 is a lay-out of a liquid crystal display module.

FIG. 1 shows a conventional lay-out of a Liquid Crystal Display module 130. The module 130 comprises two glass substrate plates 104 and 120 that sandwich a thin layer 112 of liquid crystal molecules. The liquid crystal layer 112 is composed of almost transparent substances exhibiting the properties of both solid and liquid matters. Light passing through the liquid crystal layer 112 follows the alignment of the molecules that make up the liquid crystal. Charging the liquid crystal molecules with electricity changes the molecular alignment and consequently the way the light passes through them as will be shown hereinafter. The glass substrate plates 104 and 120 are transparent substrates often made of non-alkaline glass with a low surface irregularity.

The module 130 also comprises two alignment layers 110 and 114 made of organic thin films. The layers 110 and 114 are designed to align the liquid crystal molecules of the layer 112. For example, molecules in the liquid crystal layer 112 are arranged so that the layer 112 is a nematic layer in a twisted configuration. The module 130 also contains transparent electrode layers 108 and 116 on the inside of the glass layers 104 and 120.

In addition, an active matrix layer 118 is located between the transparent electrode 116 and the glass layer 120. The active layer 118 is composed of an array of thin-film solid state devices like transistors, diodes or metal-insulator-metal devices. In this embodiment, the active layer 118 is composed of an array of Thin Film Transistors (TFTs) elements. An embodiment of a TFT element is given hereinafter with reference to FIG. 2. The module 130 also comprises a polarizer 122 and a backlight 124. The polarizer 122 either transmits or absorbs specific components of the polarized light. The backlight layer 124 comprises an edge light source and a diffuser film, both not shown here. The diffuser film uniformly directs onto the LCD panel the edge light incoming from the edge light source. The source is the illumination device and can be made of an arrangement of cold cathode fluorescent tubes, an arrangement of LEDs (Light Emitting Diodes), a combination of both or any well-known source arrangement. It has been shown that by using red, green and blue LEDs instead of cold cathode fluorescent lamps in the edge lit LCD backlight, the brightness and color performance can be improved considerably. LEDs offer various advantages such as robustness, long-life and great flexibility. In the embodiments hereinafter, the edge-lit LCD comprises at least an LED arrangement backlight 124. The backlight 124 may be comprised of an arrangement of red, green and blue LEDs. From this LED arrangement, effective color mixing and control can be performed to generate light of different colors, including white with a variable intensity level.

The LCD module 130 may also comprise controlling and driving circuitry not shown in FIG. 1.

A behavioral description of these layers 102–124 for the display of a frame is explained as follows. In this embodiment, a frame is displayed using the active matrix display method.

The LCD module 130 may be divided into an array of active cells. In this embodiment, an active cell 150 refers to a combination of at least an active element of the active matrix layer 118, a liquid crystal element of the layer 112 and a color filter element of the layer 106 such as shown in FIG. 1. The active cell 150 corresponds to a picture element (pixel) in a gray scaled monochrome display or corresponds to a sub-pixel in a color display. For example, a conventional laptop color display comprises an array of 1024 rows×768 columns of pixels, each pixel being comprised of three sub-pixels and therefore such an LCD is comprised of 1024×768×3 active cells.

In the active matrix method, a drive voltage is transmitted to the liquid crystal element through the active element, which functions as a switch. As a result, the liquid crystal molecules of the liquid crystal element become oriented so that only a portion of the incoming back-light is let through to the corresponding color filter element. The liquid crystal element operates as "shutters" whose aperture can be adjusted thereby allowing modulating the amount of the back-light that is let through. By adjusting the drive voltage and therefore the orientation of the liquid crystal element, different levels of brightness can be obtained for this active cell 150.

A color can be obtained by regulating the respective intensities of a red light component, a green light component and a blue light component transmitted by respective red, green and blue filter elements of the layer 106. A pixel comprises three sub-pixels, each sub-pixel comprising a color filter element of the layer 106 of one of the three primary color: a red color filter element, a green color filter element or a red color filter element. The human eye is not capable of distinguishing the individual red, green and blue light components since they are packed in an extremely small area. The intensity of the light transmitted to each color filter element is determined by the liquid crystal element and the active element associated with that color filter element as mentioned in the previous paragraph.

Figure 2:
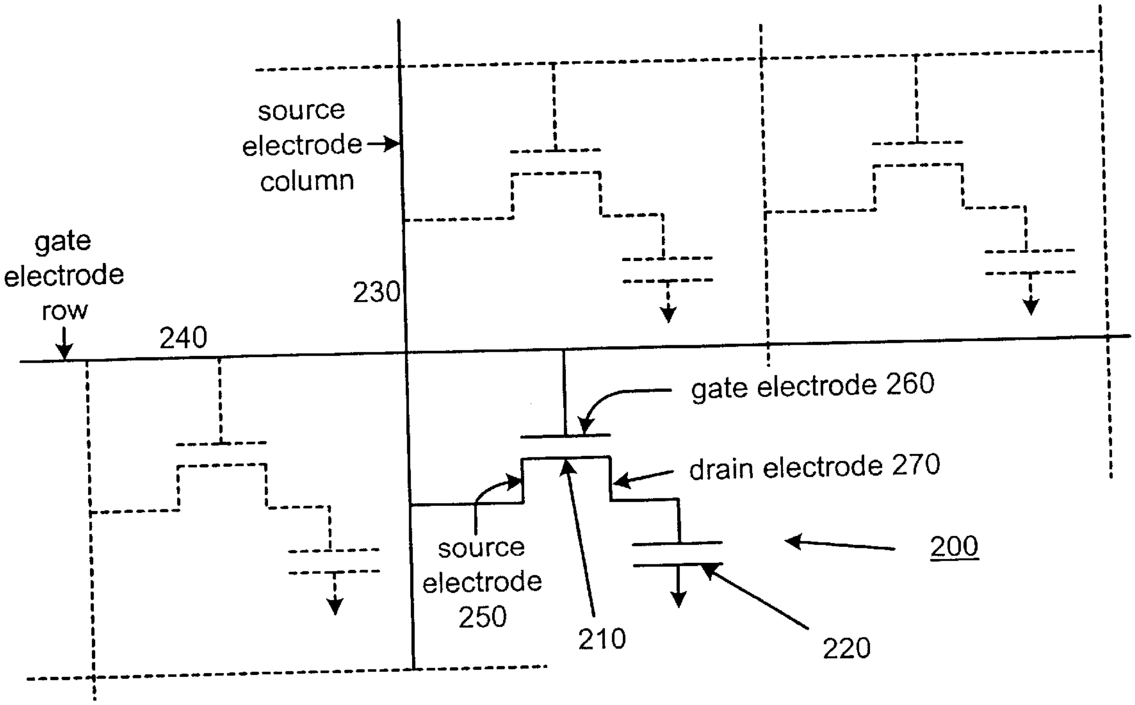
FIG. 2 depicts an array of an active cell.

FIG. 2 is an embodiment of an active element 200 of the active cell 150 in an array of active elements. In this embodiment, the active element 200 being considered is a TFT element. The TFT element 200 comprises a transistor 210 and a capacitor 220. The transistor 210 has three electrodes: a gate electrode 260, a source electrode 250 and a drain electrode 270. Current flows either from the source electrode 250 to the drain electrode 270 or from the drain electrode 270 to the source electrode 250. An "on" voltage may be applied to the gate electrode 260 by applying a charge on a gate electrode row 240. When an "on" voltage is applied to the gate electrode 260, current flows and passes between the drain electrode 270 and the source electrode 250. When an "off"voltage is applied to the gate electrode 260, the passage of the current between the source and the drain electrodes 250 and 270, respectively, is blocked. Thus, the gate electrode 260 functions as a gate for electrons, turning the transistor 210, and therefore the TFT element 200 switch, on and off.

When the TFT element 200 is on, a voltage is applied from the drain electrode 270 to the display transparent electrode 116. A drive voltage is therefore applied to the corresponding liquid crystal element of the active cell 150 and a voltage is applied between the TFT element 200 and the opposite common electrode 108. The drive voltage applied to the liquid crystal element can be varied by regulating the voltage applied to the source electrode 250 via a source electrode column 230. Thus, the voltage applied on the column 230 controls the voltage applied to the liquid crystal element of the active cell 150.

The active cell 150 is addressed by switching on the gate electrode 260. As shown herein above, the active cell 150 is addressed when a signal is applied on row 240 and when a charge is applied on column 230. Since all other rows that the column 230 crosses are turned off, only the capacitor 220 receives a charge through the transistor 210 that has been turned on. The transistor 210 is connected to the capacitor 220 so that the capacitor 220 retains the charge after the signals applied on column 230 and row 240 are turned off and before new signals are applied on column 230 and row 240 during the next refresh cycle. The capacitor 220 holds the charge until the next refresh cycle.

Figure 3:
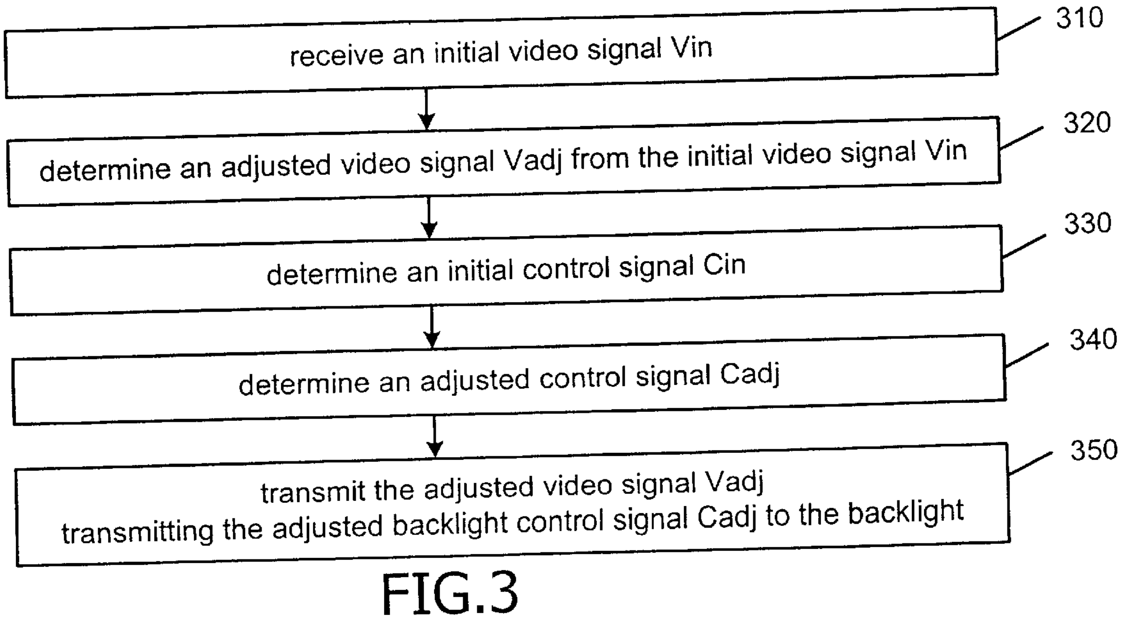
FIG. 3 and FIG. 4 are flow-charts of methods carried out by a display arrangement of the invention.

FIG. 3 is a flow-chart of a first embodiment of a method carried out by a display arrangement of the invention. This embodiment describes the processing of a video signal V and of a backlight signal B ultimately supplied to a given active cell, such as the cell 150, according to a method of the invention.

The module 130 is configured to transmit a video signal V to the given cell via column 230 and row 240. The backlight 124 transmits the backlight signal B to the cell in response to a control signal C. The transmitted video signal V controls the active element of the cell. The transmitted video signal V also controls the alignment of the liquid crystal molecules of the cell and as a result the transmittance of the liquid crystal element of the cell. The video signal V controls the proportion of the received backlight signal B that the cell internally transmits to its color filter element.

A first step 310 of a method of the invention comprises receiving an initial video signal Vin. A step 320 comprises adjusting the initial video signal Vin resulting in an adjusted video signal Vadj. The initial video signal Vin may be adjusted for a single cell or for a determined array of cells of the module 130. The adjustment of the initial video signal Vin to the adjusted video signal Vadj may be done arbitrarily or based on a distribution property of the initial video signal Vin such as a repartition of the values of the initial video signal Vin for a given frame to be displayed, the values being respectively associated with active cells of the module 130. The adjusted video signal Vadj may be obtained by filtering the initial video signal Vin.

In a step 330, an initial control signal Cin is determined and in a step 340, an adjusted control signal Cadj is determined. This adjusted control signal Cadj may be determined from the initial and adjusted video signals Vin and Vadj. In another embodiment, the adjusted control signal Cadj is also determined based on the initial control signal Cin. Then, a step 350 comprises transmitting the adjusted video signal Vadj to the active cells for which adjustment of the initial video signal Vin was performed. Step 350 also comprises transmitting the adjusted control signal Cadj to the backlight 124. The adjusted control signal Cadj controls an adjusted backlight signal Badj transmitted by the backlight 124 to the cells of the module 130. In this embodiment, the backlight 124 transmits the same adjusted backlight signal Badj to the cells of the module 130.

Thus, steps 310 to 350 allow deriving values of the adjusted signal Vadj, which are provided to respective active cells of the module 130. Steps 310 to 350 also allow generating an adjusted backlight signal Badj, which is provided to these active cells. Thus, a method of the invention allows generating an adjusted backlight signal Badj which is dependent on the adjustment of the initial video signal Vin, and, as a result which may compensate for the adjustment of the initial video signal Vin for these cells.

Figure 4:
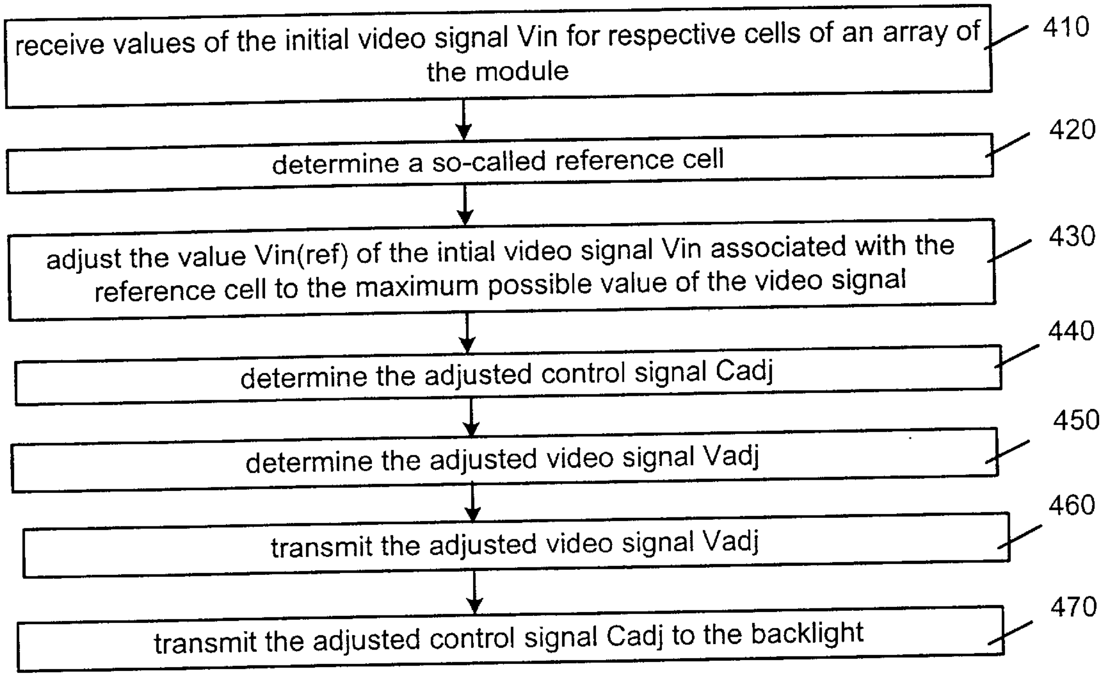

FIG. 4 is a flow-chart of a second embodiment of a method carried out by a display arrangement of the invention. In this embodiment, a first step 410 comprises receiving values of the initial video signal Vin associated with respective cells of an array of active cells of the module 130. In a step 420, the method comprises determining a specific cell from a property distribution of these values of the initial video signal Vin. This specific cell is hereinafter referred to as the reference cell. The so-called reference cell may be determined as the cell being associated with the greatest value of the initial video signal Vin. Alternatively, the reference cell may be chosen from a group of cells having values of the initial video signal Vin greater than a predefined value. In another embodiment, the reference cell is chosen arbitrarily or based on other criteria or comparison algorithms run on the initial video signal Vin.

In a step 430, the value Vin(ref) of the initial video signal Vin associated with the reference cell is adjusted to a maximal possible value that an active cell can accept according to the specifications, therefore resulting in Vadj(ref). For example, if active cells can receive video signal values within a range [0;V1] and the value Vin(ref) is V2, with V2<V1, the value Vadj(ref) of the adjusted video signal Vadj for the reference cell is set to V1. This maximal value V1 when applied to an active cell may correspond to the liquid crystal element of this cell transmitting at a maximum the backlight signal B provided by the backlight 124. Thus, applying the value V1 to the reference cell allows the reference cell to transmit a maximum amount of the backlight signal B incoming from the backlight 124. In this embodiment, increasing the video signal V allows to increase the transmittance of the cell.

In a step 440, the adjusted control signal Cadj is also determined. The control signal Cadj may be determined based on the value Vin(ref) of the initial video signal Vin associated with the reference cell and based on the value Vadj(ref) of the adjusted video signal Vadj associated with the reference cell. The adjusted control signal Cadj may also be determined based on the initial control signal Cin. The backlight 124 transmits the adjusted backlight signal Badj in response to the adjusted control signal Cadj. Such a response pattern of the backlight 124 is known from the technical characteristics of the backlight 124.

Figure 5:
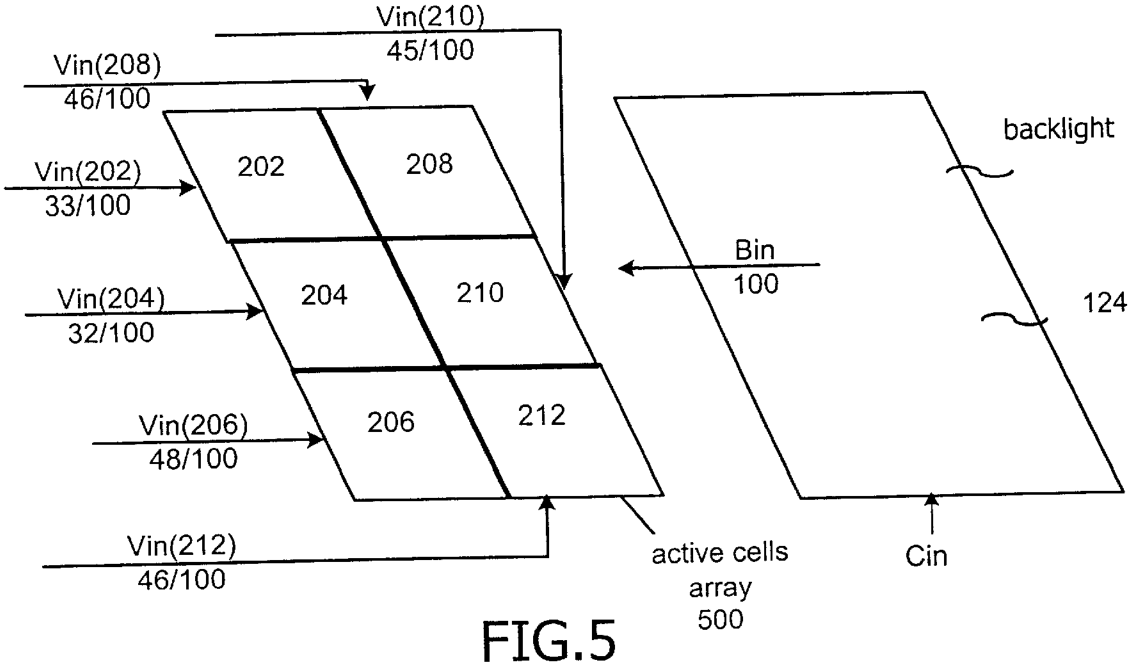
FIG. 5 and FIG. 6 depicts an array of active cells and a backlight means.
Figure 6:
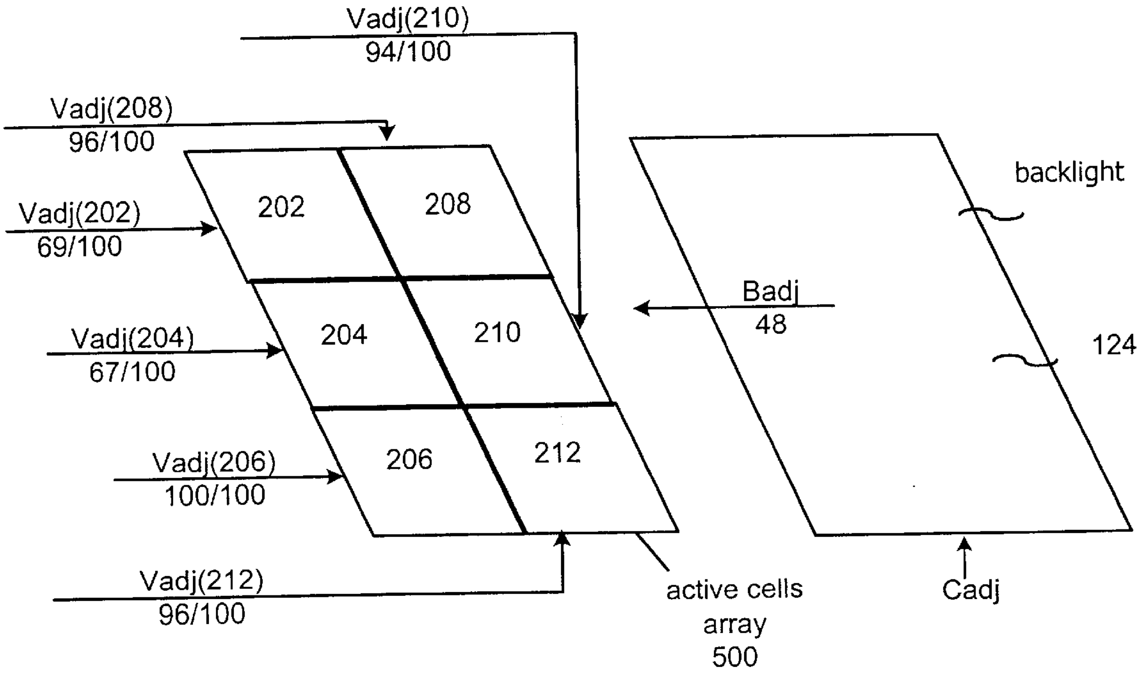

In an embodiment of the invention, the adjusted control signal Cadj may be determined so that the reference cell would produce a comparable output result when receiving the value Vin(ref) and the initial backlight signal Bin, generated in response to the initial control signal Cin, as it would produce when receiving the value Vadj(ref) and the adjusted backlight signal Badj as will be shown with reference to FIG. 5 and FIG. 6.

An active cell, as previously mentioned, produces a displayed output from the video signal V and the backlight signal B applied to the cell. Thus, when a first of the two signal V and B applied to the cell is modified, the other signal V or B can be modulated accordingly to compensate and balance for the modification of the first signal. In this embodiment, the video signal V applied to the cell has been increased from V2 to V1 and as a result, the adjusted backlight signal Badj may be lowered. It is however within the scope of the invention to determine the adjusted video signal Vadj by lowering the initial video signal Vin if lowering the initial video signal Vin would increase the transmittance of the cell to which it is applied and would allow lowering the transmitted backlight signal Badj.

A step 450 comprises determining values of the adjusted video signal Vadj. A value Vadj(α) of the adjusted signal Vadj associated with a specific cell may be determined based on the value Vin(α) of the initial video signal Vin associated with the specific cell, on the value Vin(ref) of the initial video signal Vin associated with the reference cell and on the value Vadj(ref) of the adjusted video signal Vadj associated with the reference cell. For example, the value Vadj(α) is calculated so that the ratio of the value Vadj(α) of the adjusted video signal Vadj associated with the specific cell over the value Vadj(ref) of the adjusted video signal associated with the reference cell is equal to the ratio of the value Vin(α) of the initial video signal Vin associated with the specific cell over the value Vin(ref) of the initial video signal Vin associated with the reference cell, i.e.

$$\frac{Vadj(\alpha)}{Vadj(ref)} = \frac{Vin(\alpha)}{Vin(ref)}.$$

This may be seen as proportionally spreading the initial video signal Vin to obtain the adjusted video signal Vadj.

In another embodiment, the values of the adjusted video signal Vadj for the cells other than the reference cell are determined so that the process of the invention is quasi-transparent to a user. The value Vadj(α) may be determined so that the cell would produce a similar displayed output when receiving the initial value Vin(α) and the initial backlight signal Bin as it would produce when receiving the adjusted value Vadj(α) and the adjusted backlight signal Badj. A transmittance characteristic of the cell giving values of the transmittance of the cell for respective value of the video signal V applied to the cell is well-known from the technical specification of the cell. Therefore, the adjusted value Vadj(α) can be determined from this transmittance characteristic, the adjusted backlight signal Badj and the desired output for the cell than can be evaluated from the initial value Vin(α) and the initial backlight signal Bin. For example, the transmittance characteristic pattern may be stored in a lookup table giving values of the transmittance of the active cells for specific different values of the video signal V applied to the cell or vice-versa giving values of the video signal V to be applied to the cell for desired values of the transmittance. This transmittance characteristic is not necessarily linear.

In a step 460, each cell of the array is supplied with the respective corresponding value of the adjusted video signal Vadj and in a step 470, the adjusted control signal Cadj derived in step 440 is transmitted to the backlight 124.

FIG. 5 and FIG. 6 show an array 500 of active cells 202–212. In these embodiments, a cell receiving a video signal V of value X and a backlight signal B of value Y produces an output result of X×Y. This relation between the backlight signal B, the video signal V and the output result of a cell is by no means a limitation of the invention and any mathematical relation can be considered. Furthermore, the values chosen herein for the video and the backlight signals V and B are used for explanatory purposes only and may not be taken as experimental values FIG. 5 depicts a scenario of the active cells 202–212 receiving respective values Vin(202)–Vin(212) of the initial video signal Vin and receiving the initial backlight signal Bin from the backlight layer 124, in response to the initial backlight control signal Cin transmitted to the backlight 124. As an example, the values Vin(202)–Vin(212) of the initial video signal Vin are respectively 33/100, 32/100, 48/100, 46/100, 45/100 and 46/100. The cells 202–212 accept values of the video signal V within a range [0;1]. The values Vin(202)–Vin(212) supplied to the cells 202–212 respectively indicate the transmittance of the cell 202–212 as the proportion of the received backlight signal Bin that the cell 202–212 transmit. The transmitted amount is referred to as the output result produced by the cell. A value 1 of the initial video signal Vin applied to a cell would make the cell transmit a maximum possible proportion of the backlight signal B transmitted to the cell. In this embodiment, the initial backlight signal Bin has a value of 100. As a result, the cell 202 transmits 33% of the incoming value 100 of the initial backlight signal Bin resulting in an output result value of 33 for the cell 202. Cell 204 transmits 32% of the incoming value 100 of the initial backlight signal Bin resulting in an output value of 32 , etc. . . .

FIG. 6 depicts a scenario of the same active cells 202–212 receiving respective values Vadj(202)–Vadj(212) of the adjusted video signal Vadj and the adjusted backlight signal Badj determined according to a method of the invention. In an embodiment of the invention, the cell 206 is determined as having the greatest initial video signal value Vin(206). The cell 206 is hereafter referred to as the so-called reference cell. The value Vadj(206) is arbitrarily set to the maximal possible value of the video signal V being 1. The adjusted backlight control signal Cadj is then determined from the values Vin(206), Vadj(206)=1 and the initial backlight control signal Bin. The adjusted control signal Cadj, and as a result the adjusted backlight signal Badj are determined so that the cell 206 produces a comparable output result in the first scenario depicted in FIG. 5 and in the second scenario depicted in FIG. 6, i.e. 48. The adjusted backlight signal Badj is therefore 48. In the scenario of FIG. 6, the adjusted backlight signal Badj has been lowered compared to the initial backlight signal Bin of FIG. 5.

The values Vadj(202)–Vadj(204) and Vadj(208)–Vadj (212) are then derived as follows. The value of the adjusted video signal Vadj associated with a given cell 202, . . . , 212 is determined so that the cell 202, . . . , 212 would produce a comparable output result when receiving the corresponding value of the initial video signal Vin and the initial backlight signal Bin as the cell 202, . . . , or 212 would produce when receiving the corresponding value of the adjusted video signal Vadj and the adjusted backlight signal Badj. For example, as to the cell 202, the derived value Vadj (202) of the adjusted video signal Vadj is 69/100. Indeed, by transmitting 69% of the value of the adjusted backlight signal Badj, being 48, the cell 202 produces an output result value of 33, which is comparable to the output result value of the cell 202 in the scenario of FIG. 5.

The value of the adjusted video signal Vadj associated with a given cell 202, . . . , 212 may also be derived so that the ratio of the values of the video signal V-associated with the cell and the reference cell is kept constant before and after adjustment. For example, for the cell 202 the value Vadj(202) may be derived so that $$\frac{Vin(202)}{Vin(206)} = \frac{Vadj(202)}{Vadj(206)}.$$

This adjustment allows increasing the values of the video signal Vin while keeping the statistical distribution of the values of the initial and adjusted signals Vin and Vadj constant. This adjustment also allows keeping the relative ratios among values of the adjusted video signal Vadj constant with regard to the ratios among values of the initial video signal Vin.

As a consequence, the invention allows lowering the initial backlight signal Bin of an LCD without greatly disturbing the visual impression of the individual looking at the LCD module 130. The invention permits power savings.

Figure 7:
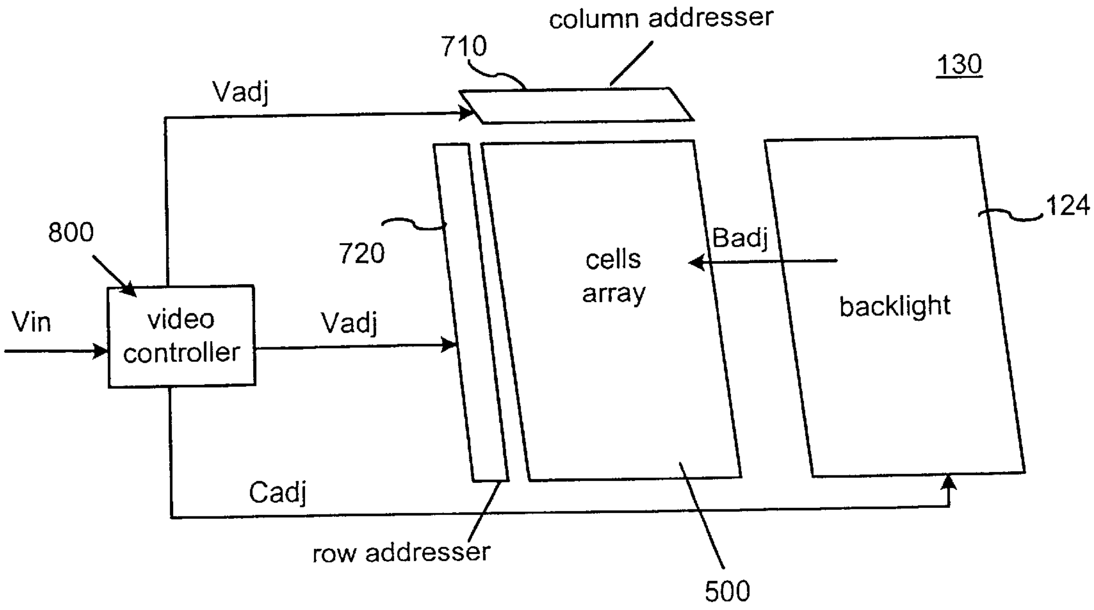
FIG. 7 is a block diagram of a display arrangement of the invention.

FIG. 7 shows a block-diagram of the LCD module 130. The module 130 comprises the array 500 of active cells and the backlight 124. The module 130 further comprises a video controller 800 of the invention that receives and processes the initial video signal Vin to generate and transmit the adjusted video signal Vadj to the cells. The controller 800 transmits the adjusted video signal Vadj to the array 500 through a column addresser 710 and a line addresser 720. The column and line addressers 710 and 720 may also comprise well-known in the art driving circuitry. In response to the received adjusted video signal Vadj, the addressers 710 and 720 accordingly address and control the cells of the array 500. The video controller 800 also allows generating the adjusted backlight signal Badj under the control of the adjusted backlight control signal Cadj. The adjusted backlight signal Badj is generated by the backlight 124.

Figure 8:
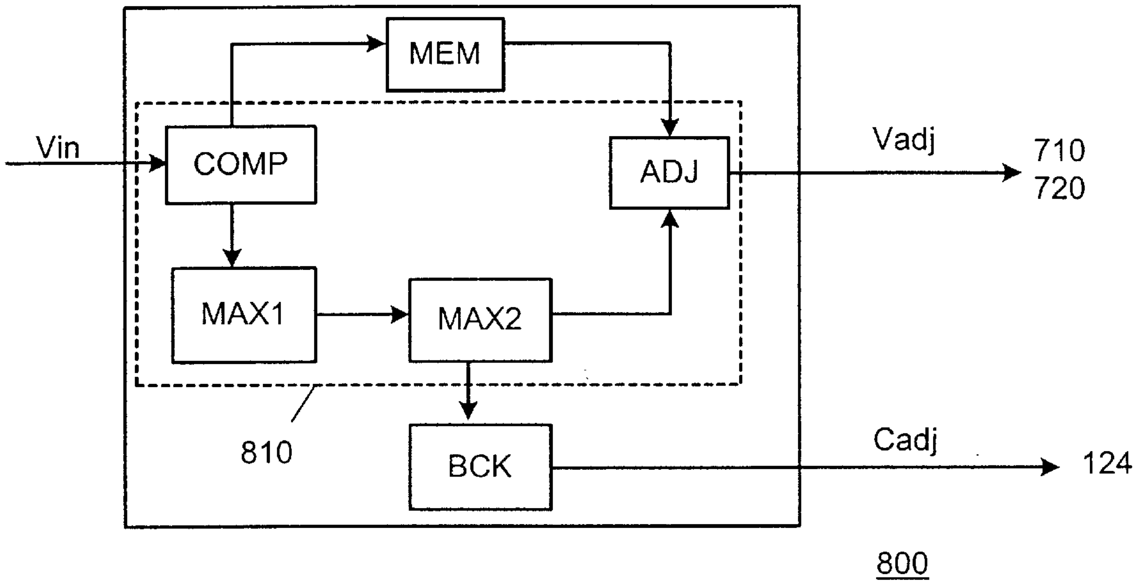
FIG. 8 and FIG. 9 are block diagrams of a controller of the invention.

FIG. 8 shows a first embodiment of the video controller 800 of the invention. The video controller 800 is a display control circuitry comprising memory means MEM, adjusting means 810 and backlight controlling means BCK. The memory means MEM is configured to store values of the initial video signal Vin, which are respectively associated with cells of the array 500. The adjusting means 810 is configured to generate the adjusted video signal Vadj and is configured to transmit the adjusted video signal Vadj to the array 500. The backlight controlling means BCK is configured to generate the adjusted control signal Cadj and to transmit the adjusted control signal Cadj to the backlight 124. In this embodiment, the adjusting means comprises a comparator COMP, and adjustment unit ADJ, a first buffer unit MAX1 and a second buffer unit MAX2. The comparator COMP receives a set of values {Vin} of the initial video signal Vin corresponding to a given frame to be displayed. The initial video signal Vin may be received from an external decoder, an optical storage medium or any other content information source. Each value of the set {Vin} is respectively associated with an active cell of the array 500. The comparator COMP allows comparing the received values {Vin} on a real-time basis upon reception of the values {Vin}. For example, the comparator COMP determines a temporary greatest value Vin(temp) from the values {Vin} received at a given instant. This temporary greatest value Vin(temp) is stored in the unit MAX1 and updated in real-time when a new value of the initial video signal Vin greater than the value Vin(temp) currently stored in the unit MAX1 is received by the comparator COMP. When the entire set {Vin} has been received and compared in the comparator COMP, the temporary maximal value Vin(temp) of the set{Vin} is transferred from the unit MAX1 to the unit MAX2. The maximal value Vin(temp) stored in the unit MAX2 is that of the so-called reference cell of the invention, referred to as Vin(ref). In another embodiment, the comparator COMP allows determining the reference cell and the associated value Vin(ref) of the initial video signal Vin based on other comparison algorithms. In such an embodiment the value Vin(ref) of the set {Vin} finally stored in the unit MAX2 is not necessarily the greatest value of the set {Vin}.

According to the invention, the value Vin(ref) stored in the unit MAX2 is adjusted to a corresponding value Vadj (ref) of the adjusted video signal Vadj. This value Vadj(ref) is determined by the unit ADJ. As mentioned in a previous paragraph, this value Vadj(ref) for the reference cell may be chosen arbitrarily by the individual or computed on the basis of a distribution property of the set {Vin} of initial values. This value Vadj(ref) may be the maximal value that the active cells can accept.

The comparator COMP is coupled to the memory MEM, where the initial values {Vin} for the cells of the array 500 are stored. The adjusting means ADJ allows deriving values {Vadj } of the adjusted video signal Vadj for the active cells of the array 500. The value of the adjusted video signal Vadj associated with a given cell is determined from the value of the initial video signal Vin associated with that cell, from the value Vin(ref) obtained from the unit MAX2 and from the value Vadj(ref) obtained from the unit ADJ.

Further, the adjusted control signal Cadj, and in a similar manner the adjusted signal Badj, may be derived in the backlight controlling means BCK based on the initial and adjusted video signals values Vin(ref) and Vadj(ref) associated with the so-called reference cell obtained from the unit MAX2 and the unit ADJ, respectively. The adjusted control Cadj may also be determined from the initial backlight control signal Cin. This initial control signal Cin may have been configured to a specific value by an individual when manually modifying the intensity or the brightness of the backlight 124. Indeed, the backlight 124 may have been set by the individual to transmit a maximum possible initial backlight signal Bin or may have been set to transmit any intermediate arbitrary possible value. The controlling means BCK provides the adjusted control signal Cadj to the backlight 124 resulting in the backlight 124 supplying the adjusted backlight signal Badj to the cells of the array 500.

The adjustment unit ADJ supplies the values {Vadj } of the adjusted video signal Vadj to the respective active cells through the addressers 710 and 720. Thereby the cells of the array 500 are accordingly addressed by the addressers 710 and 720 and the frame may be displayed.

The same is then reiterated for a new set of values {Vin} of the initial video signal Vin received for a subsequent new frame to be displayed. In a common LCD module, the refresh rate is 60 Hz and the fast switching capability of LEDs allow manipulating the control signal Cadj and as a result the backlight signal Badj for each new frame displayed as such a refresh rate.

Alternatively, the adjusting means 810 does not comprise the comparator COMP and the buffers MAX1 and MAX2 and the adjusting unit ADJ. The adjusting means may comprise filtering means that allow filtering the initial video signal thereby providing the adjusted vide signal Vadj.

Figure 9:
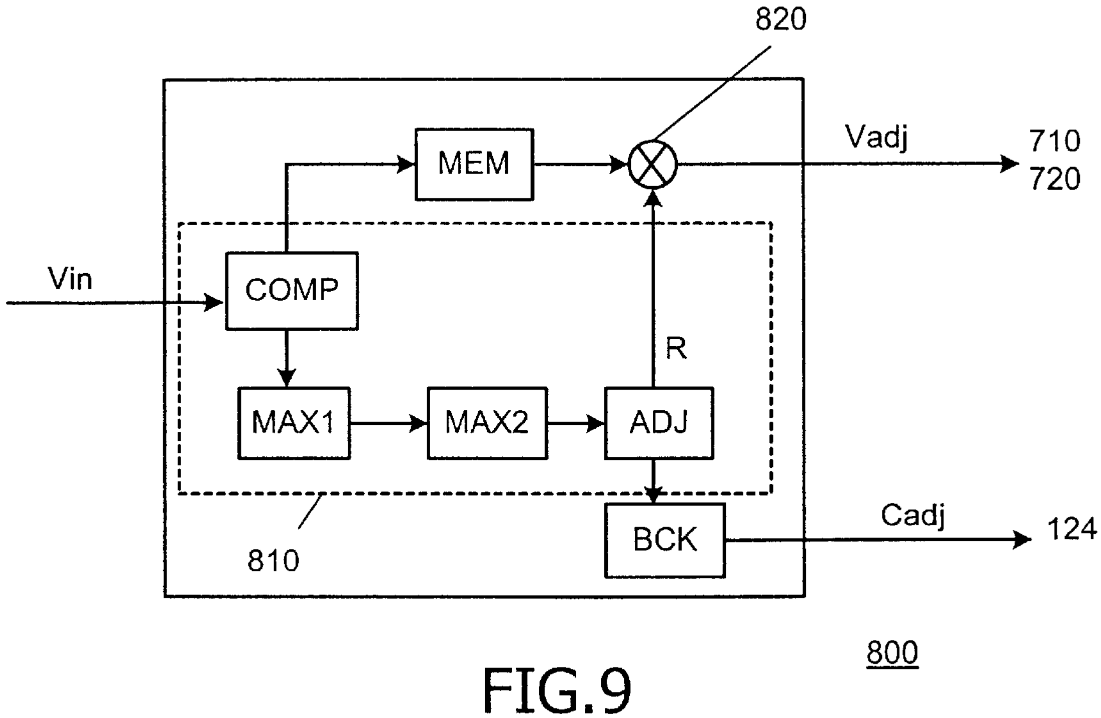

FIG. 9 is a second embodiment of the controller 800. In this embodiment, the adjustment unit ADJ allows determining a coefficient R, which is used to determine the values {Vadj } of the adjusted video signal Vadj and the adjusted control signal Cadj. This coefficient R is determined from the values Vin(ref) and Vadj(ref) associated with the reference cell, respectively obtained from the unit MAX2 and the unit ADJ. The coefficient R may be the ratio of the value Vadj(ref) over the value Vin(ref). In this embodiment the value of the adjusted video signal Vadj associated with a given cell is determined by multiplying the value of the initial video signal Vin associated with that cell by this ratio R in a multiplier 820. As a result, the ratio between the value of the video signal V associated with the cell and the value of the video signal V associated with the reference cell is the same before and after adjustment in accordance with the invention.

As previously mentioned, the processing of the initial video signal Vin may be seen as spreading or expanding the initial range covered by the set of values {Vin} of the initial video signal Vin to a broader range covered by the set of values {Vadj} of the adjusted video signal Vadj.

Similarly, the coefficient R is used to determine the value of the adjusted backlight control signal Cadj transmitted to the backlight 124 to produce the adjusted backlight signal Badj.

In an embodiment of the invention, the backlight 124 is comprised of an arrangement of red, green and blue LEDs. As mentioned previously, the respective intensities of these RGB LEDs may be modulated to produce a defined color or a white color.

In an embodiment of the invention, the adjustment of the values {Vin} is done on the basis of the entire set of values {Vin} that was received. In this embodiment, a single adjusted backlight control signal Cadj is determined as being the control signal in response to which the entire set of LEDs of the backlight 124 responds. This signal Cadj controls the intensity of the white light transmitted by the arrangement of RGB LEDs of the backlight 124. No distinction is made among the active cells of the array comprising red filter elements, green filter elements or blue filter elements on the contrary of the embodiment of the invention disclosed hereinafter.

In another embodiment of the invention, the values {Vin} are sorted out and processed separately depending on whether these values {Vin} are associated with active cells comprising red filter elements, active cells comprising green filter elements or active cells comprising blue filter elements. This may be considered as splitting the initial set {Vin} in three different sets: a first set {Vin_red} comprising values of the initial video signal Vin associated with active cells comprising red filter elements, a second set {Vin_blue} comprising values of the initial video signal Vin associated with active cells comprising blue filter elements and a third set {Vin_green} comprising values of the initial video signal Vin associated with active cells comprising green filter elements. A filter element of one of the three primary colors mostly transmits the light of the wavelength of that primary color. Thus, a red filter element mostly transmits red light and partially blocks most blue and green light. A green filter element mostly transmits green light and partially blocks most red and blue light. A blue filter element mostly transmits blue light and partially blocks most green light and red light. As a consequence, blue filter elements of the layer 106 block most of the light emitted by the red and green LEDs of the backlight 124, and, partially or totally transmit the light from the blue LEDs of the backlight 124. The red filter elements of the layer 106 block most of the light emitted by the blue and green LEDs of the backlight, and, partially or totally transmit the light emitted from the red LEDs of the backlight 124. Similarly, the green filter elements of the layer 106 block most of the light emitted by the red and blue LEDs of the backlight 124, and, partially or totally transmit the light emitted by the green LEDs of the backlight 124. The amount of light transmitted by each filter element is determined by the value of the video signal applied to the corresponding active cell.

As a consequence the active cells of the array 500 comprising red filter elements may be adjusted quasi-independently from the active cells of the array 500 comprising green filter elements and from the active cells of the array 500 comprising blue filter elements. The adjustment of the active cells comprising red filter elements is indeed partially dependent from the other cells of the array since the green and blue filter elements also transmit a small amount of the red light component incoming from the backlight due to the well-known overlap of the transmittance response of the three types of primary color filters mentioned here.

In this embodiment, a first adjustment of the values {Vin_red} of the initial video signal Vin associated with active cells comprising red filter elements is performed following a method of the invention. From this first adjustment, a first adjusted backlight control signal Cadj_red is determined. The first adjusted backlight control signal Cadj_red is transmitted to the red LEDs of the backlight 124 and controls the intensity of the red backlight signal emitted by these red LEDs to the active cells of the array 500.

A second adjustment of the values {Vin_green} of the initial video signal Vin associated with active cells comprising green filter elements is then performed following a method of the invention. A second adjusted backlight control signal Cadj_green is determined. The second adjusted backlight control signal Cadj_green is transmitted to the green LEDs of the backlight 124 and controls the intensity of the green backlight signal emitted by these green LEDs to the active cells of the array 500.

Then, a third adjustment of the values {Vin_blue} of the initial video signal Vin associated with active cells comprising blue filter elements is performed following a method of the invention. A third adjusted backlight control signal Cadj_blue is determined. The third adjusted backlight control signal $Cadj_{13}$ blue is transmitted to the blue LEDs of the backlight 124 and controls the intensity of the blue backlight signal emitted by these blue LEDs to the active cells of the array 500.

Alternatively, adjustments corresponding to only one or two of the primary colors is performed. In this embodiment, the resulting backlight signal Badj emitted by the backlight 124 may appear colored depending on the adjusted control signals Cadj_green, Cadj_red and Cadj_blue.

It is to be noted that, with respect to the described display arrangement, modifications or improvements may be proposed without departing from the scope of the invention. For instance, it is clear that the method carried out in such a display arrangement may be implemented in several manners, such as by means of wired electronic circuits or, alternatively, by means of a set of instructions stored in a computer-readable medium, said instructions replacing at least a part of said circuits and being executable under the control of a computer or a digital processor in order to carry out the same functions as fulfilled in said replaced circuits.

It is also to be noted that the invention encompasses any apparatus comprising a transmissive display arrangement as described herein. Indeed such a display arrangement may be implemented as the screen of a television set, as the screen and related circuitry of a personal computer or a laptop, as the screen of a mobile phone or PDA and the like.

I claim:

1. An apparatus, comprising:

a transmissive display arrangement including an array of cells;

video controlling means for deriving an adjusted video signal from an initial video signal representing a frame to be displayed by the display arrangement;

backlight means, coupled to the array of cells, for providing a backlight signal to the array in response to a backlight control signal associated with the frame;

backlight controlling means, coupled to the video controlling means and to the backlight means, for deriving the backlight control signal from the initial video signal and the adjusted video signal;

wherein the backlight controlling means is configured to further derive the backlight control signal from a maximum allowed value for the initial video signal and from a reference value of the initial video signal, said reference value being determined from a distribution property of the initial video signal.

2. The apparatus of claim 1, wherein the backlight controlling means is configured to further derive the backlight control signal based on an initial backlight control signal, the initial backlight control signal being obtained from a previous setting of the display arrangement.

3. The apparatus of claim 1, wherein the backlight controlling means is configured to derive the backlight control signal for each frame.

4. The apparatus of claim 1, further comprising:

memory means, coupled to the backlight controlling means, for storing a lookup table representative of a transmittance characteristic of a cell of the array;

wherein, the backlight controlling means is configured to further determine the backlight control signal based on the transmittance characteristic of the cell.

5. The apparatus of claim 1, wherein the video controlling means is configured to further derive the adjusted video signal based on a distribution property of the initial video signal.

6. The apparatus of claim 1, wherein the reference value is a maximum of the initial video signal.

7. The apparatus of claim 1, wherein for each cell of the array, the video controlling means is configured to derive a value of the adjusted video signal associated with the cell based on the reference value, the maximum allowed value, and a value of the initial video signal associated with the cell.

8. A transmissive display arrangement, comprising:

an array of cells;

video controlling means for deriving an adjusted video signal from an initial video signal representing a frame to be displayed by the display arrangement;

backlight means coupled to the array of cells, for providing a backlight signal to the array in response to a backlight control signal associated with the frame; and backlight controlling means, coupled to the video controlling means and to the backlight means, for deriving the backlight control signal from the initial video signal and the adjusted video signal;

wherein the backlight controlling means is configured to further derive the backlight control signal from a maximum allowed value for the initial video signal and from a reference value of the initial video signal, said reference value being determined from a distribution property of the initial video signal.

9. The display arrangement of claim 8, wherein the backlight controlling means is configured to further derive the backlight control signal based on an initial backlight control signal, the initial backlight control signal being obtained from a previous setting of the display arrangement.

10. The display arrangement of claim 8, wherein the backlight controlling means is configured to derive the backlight control signal for each frame.

11. The display arrangement of claim 8, wherein the array comprises a group of cells respectively including a color filter associated with a specific one of the three primary colors;

the backlight means comprises a set of LEDs configured to transmit a color-associated backlight signal of the specific primary color in response to a color-associated backlight control signal; and, the backlight controlling means is configured to derive the color-associated backlight control signal from values of the initial video signal associated with the group of cells and from values of the adjusted video signal associated with the group of cells.

12. A control circuit for a transmissive display arrangement, the control circuit comprising:

a video controlling means for deriving an adjusted video signal from an initial video signal representing a frame to be displayed by the display arrangement; and a backlight controlling means, coupled to the video controlling means, for deriving a backlight control signal, associated with the frame, from the initial video signal and the adjusted video signal, the backlight control signal being for adjusting a backlight signal in the display arrangement;

wherein the backlight controlling means is configured to further derive the backlight control signal from a maximum allowed value for the initial video signal and from a reference value of the initial video signal, said reference value being determined from a distribution property of the initial video signal.

13. The control circuit of claim 12, wherein the backlight controlling means is configured to further derive the backlight control signal based on an initial backlight control signal, the initial backlight control signal being obtained from a previous setting of the display arrangement.

14. A computer readable storage medium for storing instructions for carrying out a method of adjusting a backlight signal in a transmissive display arrangement, the method comprising:

deriving an adjusted video signal from an initial video signal representing a frame to be displayed by the display arrangement; and deriving a backlight control signal, associated with the frame, from the adjusted video signal, the initial video signal, a maximum allowed value for the initial video signal, and from a reference value of the initial video signal, said reference value being determined from a distribution property of the initial video signal, the backlight control signal being for adjusting the backlight signal.

* * * * *